United States Patent Office 2,847,710
Patented Aug. 19, 1958

2,847,710

METHOD OF IMPROVING FLUID PROPERTIES OF FINELY DIVIDED MATERIALS

Emory W. Pitzer, Bartlesville, Okla., assignor to Phillips Petroleum Company, a corporation of Delaware No Drawing. Application June 7, 1954
Serial No. 435,065

10 Claims. (Cl. 18—55)

This invention relates to a process for improving the fluid properties of particulate materials of small size. A specific aspect of the invention is concerned with a process for improving the fluid properties of finely comminuted catalytic materials, such as metal compounds, including metal oxides, metal salts, etc.

Many materials in finely comminuted form have poor fluid characteristics which render it difficult to transport the material from place to place by flowing and, particularly it is difficult to flow catalytic powders into pelleting dies or molds. My copending application Serial No. 363,411, filed June 22, 1953 relates to a method of making catalytic pellets of powdered catalytic materials, such as mixtures of oxides, salts, etc. It has been found that powders of this type have poor fluid properties rendering it extremely difficult to flow the powdered materials into small pelleting dies required in making pellets of a diameter in the range of 1/8" to 1/4".

The invention is concerned principally with the improvement in the fluid properties of materials of the nature of catalytic powders of metal compounds so that the same may be flowed into small molds or dies with sufficient ease to readily fill the dies. The principal object of the invention is to provide a process for improving the fluid properties of finely comminuted materials. Another object is to provide an improved process for pelleting or molding powdered solid materials, such as catalyst powders. Other objects of the invention will become apparent upon consideration of the accompanying disclosure.

I have found that finely comminuted solids which have poor fluid characteristics or properties can be made extremely fluid by forming a mixture of the finely comminuted solids with a normally solid material which melts at an elevated temperature considerably lower than the melting point of the finely comminuted material or below a temperature which is deleterious to the material being fluidized, melting the normally solid material, and cooling at least to the solidification temperature. The normally solid material which can be utilized to improve the fluid properties of solids in finely comminuted form are preferably thermally unstable or combustible materials which function as a lubricant and/or binder in the pelleting process applied to the fluid material. Any of the solid lubricant-binders of the pelleting art are generally suitable in the process of the invention. These materials include such lubricant-binders as "Sterotex" (hydrogenated corn oil), hydrogenated peanut oil, hydrogenated cotton seed oil and the like (solid hydrogenated vegetable oils), waxes, asphalts, sugar, ammonium compounds, metal salts and metal soaps, where the addition of a metal compound is not objectionable. Other materials of this class include solid resins of both natural and synthetic origin, wood rosin, and solid polymers of low melting point. This list of materials does not represent all of the materials which are suitable for use in the process of invention. Any of the well known pelleting aids which are solid at normal temperature, and have relatively low melting points can be utilized to advantage in this process.

The invention will be described principally in terms of catalytic powdered materials, but it is to be understood that the process is applicable to numerous other finely comminuted materials such as ammonium nitrate, ammonium sulfate, phosphate and other rock type fertilizers, carbon black, plastics, and resins. All of these and other materials which have poor flow characteristics in finely comminuted form can be made more fluid by the process described herein.

My process comprises, in its broadest aspect, forming an intimate mixture of a particulate material of small size with a normally solid combustible material in molten form and cooling the resulting mixture to a temperature below the melting point of the combustible material thereby improving the fluid properties of the particulate material. In practicing the process the amount of normally solid liquefiable "fluidizing" material added to the material to be rendered more fluid is usually less than 50% of the mixture and is preferably in the range of 1–25 weight percent thereof. In pelleting catalytic materials of the nature of powdered metal oxides and other metal compounds it is generally preferred to utilize an amount of fluidizing material in the range of 5–15 weight percent, although greater and lesser amounts outside of this range may be utilized.

It is preferred to simultaneously mix the particulate solid to be fluidized and the fluidizing agent in dry condition and reduce the particle size to the desired level so as to produce a substantially homogeneous mixture. This may be done by admixing the selected materials in a fine grinding apparatus such as a ball, rod, tube, or hammer mill until the particle size of the material is smaller than about 25 microns and more desirably to a size less than about 5 microns. The comminution is preferably carried out dry without the use of other lubricant than the fluidizing agent, but if desired an additional lubricant may be used in the comminution step and preferably the lubricant is one of the class described as fluidizing agents herein. In some instances comminution of the material to be fluidized is effected in fine grinding apparatus using water as a lubricant and thereafter removing water to obtain dry powdered material to which is added the fluidizing agent. In instances where the solid to be fluidized is in sufficiently finely divided form for the use intended, the fluidizing agent is admixed therewith in any suitable mixing device or by any suitable method to produce a homogeneous mixture of the constituents involved. After obtaining a substantially homogeneous mixture the same is heated to a temperature at which the fluidizing agent melts and the mixture is then cooled to a temperature below the melting point of the fluidizing agent. The resulting mixture has good fluid properties and can be made to flow into small dies or molds or through relatively small openings.

It is also feasible to introduce the fluidizing agent in molten form to the particulate solids to be fluidized and thereafter form a substantially homogeneous mixture of the particulate solid and the fluidizing agent.

In instances where the particulate or powdered material is to be molded or pelleted the cooled mixture of powder and fluidizing agent is flowed into the dies or molds so as to fill the same and thereafter the material in the molds is compressed into compact form so as to produce pills or pellets or other shapes which are self-sustaining. After the pilling or pelleting operation the resulting pills are calcined so as to burn out the combustible fluidizing agent and render the resulting pills porous and active.

The process of the invention was discovered in connection with the pelleting process disclosed in my copending application Serial No. 363,411. In the process disclosed therein a mixture of aluminum oxide and chromium oxide was micronized to a particle size of about 3 microns to form a homogeneous mixture of the oxides and a lubricant-binder (Sterotex) was incorporated in the mixture during the comminution or mixing. It was found that the resulting powdered material was not readily amenable to flowing into 1/8" dies in the pelleting machine. It was unexpectedly found that by heating the homogeneous mixture of metal oxides and Sterotex so as to melt the Sterotex and thereafter cooling the same to below the melting point of the Sterotex, the resulting mixture had exceptionally good fluid properties and might be said to have been "fluidized" by the Sterotex and the heating and cooling steps.

The following specific example is set forth as illustrative of the invention and is not to be interpreted as imposing unnecessary limitations on the scope of the invention.

A finely divided chromia-alumina catalyst powder of about 1 micron particle size would not flow uniformly into 1/8" dies of a pilling machine. This catalyst powder was mixed with 10 weight percent hydrogenated corn oil ("Sterotex"), sieved through an 80-mesh sieve, stirred and heated to 130° F. so as to melt the "Sterotex," and cooled to room temperature. The resulting material flowed freely into the 1/8 inch dies. The operator of the pilling machine reported that this powder flowed as well as the best-flowing material he had used. After pilling, the "Sterotex" was removed from the catalyst by calcination.

As a possible explanation of the function of the fluidizing agent, it appears that the low melting material forms a coat around the small particles of solid and in some instances, at least, has a granulating effect thereon. When relatively large amounts of fluidizing agent are used, such as 25 to 50 weight percent of the mixture, it is sometimes desirable to break up some of the larger agglomerates by grinding, crushing or other suitable means.

Certain modifications of the invention will become apparent to those skilled in the art and the illustrative details disclosed are not to be construed as imposing unnecessary limitations on the invention.

I claim:

1. An improved process for improving the fluid properties of a powdered solid catalytic material comprising a metal compound of an average particle size of less than 25 microns for flowing same into pelleting molds and for pelleting same, which comprises forming an intimate dry mixture of said catalytic material with a normally solid combustible material which melts at an elevated temperature considerably lower than the melting point of said catalytic material in an amount in the range of 5 to 25 weight percent of said catalytic material; heating said dry mixture so as to melt said solid combustible material and form a liquid coating on said catalytic material; cooling said mixture to a temperature below the melting point of said combustible material, thereby rendering the resulting mixture more fluid and better adapted to flow into small pelleting dies; and pelleting said mixture by flowing same into small dies and compressing same therein.

2. The process of claim 1 wherein the amount of said solid material is in the range of 5 to 15 weight percent of said powdered material.

3. The process of claim 1 wherein the average particle size of said powdered material is below about 5 microns and said solid material is in finely comminuted form.

4. The process of claim 1 wherein said powdered material comprises at least one metal oxide.

5. The process of claim 1 wherein said solid material is a combustible organic binder-lubricant.

6. A process for pelleting powdered catalytic material comprising a metal compound of an average particle size below about 25 microns which does not readily flow into 1/8" to 1/4" dies, which comprises admixing therewith a solid combustible organic binder-lubricant having a melting point below that of said catalytic material in an amount in the range of 5 to 15 weight percent of said catalytic material; heating the resulting mixture so as to melt at least the major proportion of said solid material and form a coating on said catalytic material; cooling the heated mixture to below the melting point of said solid material; flowing said admixture into 1/8" to 1/4" dies of a pilling machine; and pilling said mixture therein.

7. The process of claim 6 wherein said solid material and said combustible organic binder-lubricant are finely ground together prior to the heating step to form a homogeneous mixture.

8. The process of claim 6 wherein the catalyst material comprises at least one metal oxide.

9. The process of claim 6 wherein said catalytic material is composed principally of particles of less than about 5 microns in size and said solid combustible organic binder-lubricant is in finely comminuted form.

10. The process of claim 6 wherein the step of burning out the binder-lubricant from the pilled material.

References Cited in the file of this patent

UNITED STATES PATENTS

| | | |
|---|---|---|
| 1,924,401 | Gilleo | Aug. 29, 1933 |
| 2,109,592 | Macht et al. | Mar. 1, 1938 |
| 2,211,738 | Cairns | Aug. 13, 1940 |
| 2,326,984 | Tomlin | Aug. 17, 1943 |
| 2,335,804 | Silk | Nov. 30, 1943 |
| 2,338,164 | Cairns | Jan. 4, 1944 |
| 2,355,269 | Cairns | Aug. 8, 1944 |
| 2,397,831 | Bellamy | Apr. 2, 1946 |
| 2,460,811 | Davies et al. | Feb. 8, 1949 |
| 2,465,773 | Wernlund | Mar. 29, 1949 |
| 2,685,707 | Llewellyn et al. | Aug. 10, 1954 |

FOREIGN PATENTS

| | | |
|---|---|---|
| 105,612 | Australia | Nov. 3, 1938 |

UNITED STATES PATENT OFFICE
CERTIFICATE OF CORRECTION

Patent No. 2,847,710

August 19, 1958

Emory W. Pitzer

It is hereby certified that error appears in the printed specification of the above numbered patent requiring correction and that the said Letters Patent should read as corrected below.

Column 4, line 40, for "wherein" read -- including --.

Signed and sealed this 24th day of February 1959.

(SEAL)
Attest:
KARL H. AXLINE
Attesting Officer

ROBERT C. WATSON
Commissioner of Patents